(12) United States Patent
Lebel et al.

(10) Patent No.: US 10,041,675 B2
(45) Date of Patent: Aug. 7, 2018

(54) MULTIPLE VENTILATED RAILS FOR SEALING OF COMBUSTOR HEAT SHIELDS

(71) Applicant: Pratt & Whitney Canada Corp., Longueuil (CA)

(72) Inventors: Larry Lebel, Vercheres (CA); Michael Papple, Verdun (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 632 days.

(21) Appl. No.: 14/295,687

(22) Filed: Jun. 4, 2014

(65) Prior Publication Data

US 2015/0354818 A1 Dec. 10, 2015

(51) Int. Cl.
| F23R 3/00 | (2006.01) |
| F23R 3/60 | (2006.01) |
| F23R 3/06 | (2006.01) |
| F02C 7/28 | (2006.01) |

(52) U.S. Cl.
CPC ............... *F23R 3/002* (2013.01); *F02C 7/28* (2013.01); *F23R 3/06* (2013.01); *F23R 3/60* (2013.01); *F23M 2900/05005* (2013.01); *F23R 2900/00012* (2013.01); *F23R 2900/03041* (2013.01); *F23R 2900/03044* (2013.01); *Y02T 50/675* (2013.01)

(58) Field of Classification Search
CPC .... F23R 3/002; F23R 3/06; F23R 3/60; F23R 3/283; F23R 2900/03044; F23R 2900/00012; F23R 2900/00005; F23M 2900/05005; F23M 5/02; F23M 5/025; F23M 5/085; F23M 2900/05021; F02C 7/28; Y02T 50/675

See application file for complete search history.

(56) References Cited

U.S. PATENT DOCUMENTS

| 3,824,030 | A | | 7/1974 | Defeo |
| 3,907,457 | A | | 9/1975 | Nakamura |
| 4,642,993 | A | | 2/1987 | Sweet |
| 4,832,999 | A | | 5/1989 | Sweet |
| 5,253,471 | A | | 10/1993 | Richardson |
| 5,291,732 | A | | 3/1994 | Halila |
| 5,333,443 | A | * | 8/1994 | Halila ..................... F23R 3/002 60/752 |
| 5,363,643 | A | | 11/1994 | Halila |
| 5,396,759 | A | * | 3/1995 | Richardson ............. F23R 3/002 60/756 |
| 5,509,270 | A | | 4/1996 | Pearce et al. |
| 5,581,999 | A | | 12/1996 | Johnson |

(Continued)

FOREIGN PATENT DOCUMENTS

| GB | 2353589 | 2/2001 |
| GB | 2361304 | 10/2001 |

*Primary Examiner* — Gerald L Sung
*Assistant Examiner* — Alain Chau
(74) *Attorney, Agent, or Firm* — Norton Rose Fulbright Canada LLP (57) ABSTRACT

A seal for sealing a combustor heat shield against an interior surface of a combustor shell, the seal comprising: an upstream rail and an downstream rail defining an intermediate groove therebetween, each rail having a sealing surface with a plurality of slots extending between an upstream wall surface and a downstream wall surface, the sealing surface conforming to the interior surface of the combustor shell and defining a leakage gap therebetween.

16 Claims, 10 Drawing Sheets

(56) References Cited

U.S. PATENT DOCUMENTS

| | | | |
|---|---|---|---|
| 5,974,805 A | 11/1999 | Allen | |
| 6,470,685 B2 | 10/2002 | Pidcock et al. | |
| 6,751,961 B2* | 6/2004 | Pacheco-Tougas | F23R 3/002 60/752 |
| 6,938,424 B2 | 9/2005 | Tiemann | |
| 6,978,618 B2* | 12/2005 | Pacheco-Tougas | F23R 3/002 60/752 |
| 7,013,634 B2* | 3/2006 | Pidcock | F23R 3/002 60/39.821 |
| 7,140,185 B2* | 11/2006 | Burd | F23M 5/085 110/336 |
| 7,152,864 B2* | 12/2006 | Amos | F01D 11/005 277/650 |
| 7,594,401 B1* | 9/2009 | Chen | F01D 9/023 60/752 |
| 7,665,306 B2 | 2/2010 | Bronson et al. | |
| 7,849,694 B2 | 12/2010 | Dahlke et al. | |
| 8,113,004 B2 | 2/2012 | Carlisle et al. | |
| 9,010,122 B2* | 4/2015 | Bangerter | F23R 3/06 60/752 |
| 2002/0056277 A1 | 5/2002 | Parry | |
| 2005/0022531 A1* | 2/2005 | Burd | F23R 3/002 60/752 |
| 2005/0081527 A1 | 4/2005 | Howell | |
| 2006/0255549 A1* | 11/2006 | Amos | F16J 15/0887 277/644 |
| 2008/0115506 A1* | 5/2008 | Patel | F02C 3/145 60/804 |
| 2009/0035124 A1* | 2/2009 | Bohrenkamper | F01D 5/08 415/116 |
| 2009/0077974 A1 | 3/2009 | Dahlke | |
| 2010/0115967 A1* | 5/2010 | Maltson | F01D 5/186 60/806 |
| 2010/0212324 A1* | 8/2010 | Bronson | F02C 7/264 60/752 |
| 2011/0185737 A1* | 8/2011 | Dierberger | F23M 5/02 60/752 |
| 2011/0185739 A1* | 8/2011 | Bronson | F02C 7/18 60/755 |
| 2013/0327057 A1 | 12/2013 | Cunha | |
| 2014/0030064 A1* | 1/2014 | Bangerter | F23R 3/06 415/115 |
| 2014/0144148 A1* | 5/2014 | Jause | F02C 7/20 60/772 |
| 2015/0096302 A1 | 4/2015 | Herborth | |
| 2015/0292741 A1* | 10/2015 | Cunha | F23R 3/002 60/752 |

\* cited by examiner

MULTIPLE VENTILATED RAILS FOR SEALING OF COMBUSTOR HEAT SHIELDS

TECHNICAL FIELD

The application relates to sealing of openings and joint edges of combustor heat shield panels for gas turbine engines.

BACKGROUND OF THE ART

The combustors of gas turbine engines have a metal support shell that is protected from the heat of combustion gases by a ceramic lining made up from multiple heat shield panels. The combustor shells and heat shields are perforated to permit compressed cooling air to pass from a surrounding plenum through the combustor shell into an intermediate cooling cavity then through the heat shield into the hot gases within the combustor. The heat shield and flow of cooling air prevent direct contact between the metal combustor shell and the hot combustion gases. The flow of cooling air cools the shell and heat shield.

The compressed cooling air contained within the intermediate cooling cavity has a higher pressure than the combustion gases to propel the cooling air into the combustor in the intended direction of flow. Since the heat shields containing the compressed cooling air are made of multiple panels with edge joints and include openings for igniters and fuel nozzles, adequate sealing of the heat shield edges and openings is necessary to ensure that the flow of cooling air is controlled. Production of compressed cooling air in the air compressor of the engine consumes energy and accordingly excessive or uncontrolled leakage of cooling air represents a loss of energy and lower engine efficiency.

It is desirable to reduce any uncontrolled leakage of cooling air around openings and edges of the heat shield panels within a combustor to reduce the unnecessary consumption of cooling air and thereby increase engine efficiency.

SUMMARY

In accordance with a general aspect, there is provided a seal for sealing a combustor heat shield against an interior surface of a combustor shell, the seal comprising: an upstream rail and an downstream rail defining an intermediate groove therebetween, each rail having a sealing surface with a plurality of slots extending between an upstream wall surface and a downstream wall surface, the sealing surface conforming to the interior surface of the combustor shell and defining a leakage gap therebetween.

In accordance with another general aspect, there is provided a combustor heat shield for a gas turbine engine, comprising a heat shield panel adapted to be mounted to a combustor wall with a back face of the heat shield panel in spaced-apart facing relationship with an interior surface of a combustor shell to define an air gap between the heat shield panel and the combustor shell, an upstream rail and an downstream rail projecting from the back face of the heat shield panel across the air gap for sealing engagement with the combustor wall, the upstream and downstream rails defining an intermediate groove therebetween, each rail having a sealing surface with a plurality of slots extending between an upstream wall surface and a downstream wall surface, the sealing surface conforming to the interior surface of the combustor shell and defining a leakage gap therebetween.

DESCRIPTION OF THE DRAWINGS

FIG. 3 is a detail axial cross-section view similar to FIG. 2 but showing two rails and an intermediate groove in accordance with a first embodiment of the invention.

DETAILED DESCRIPTION OF PREFERRED EMBODIMENTS

Figure 1:
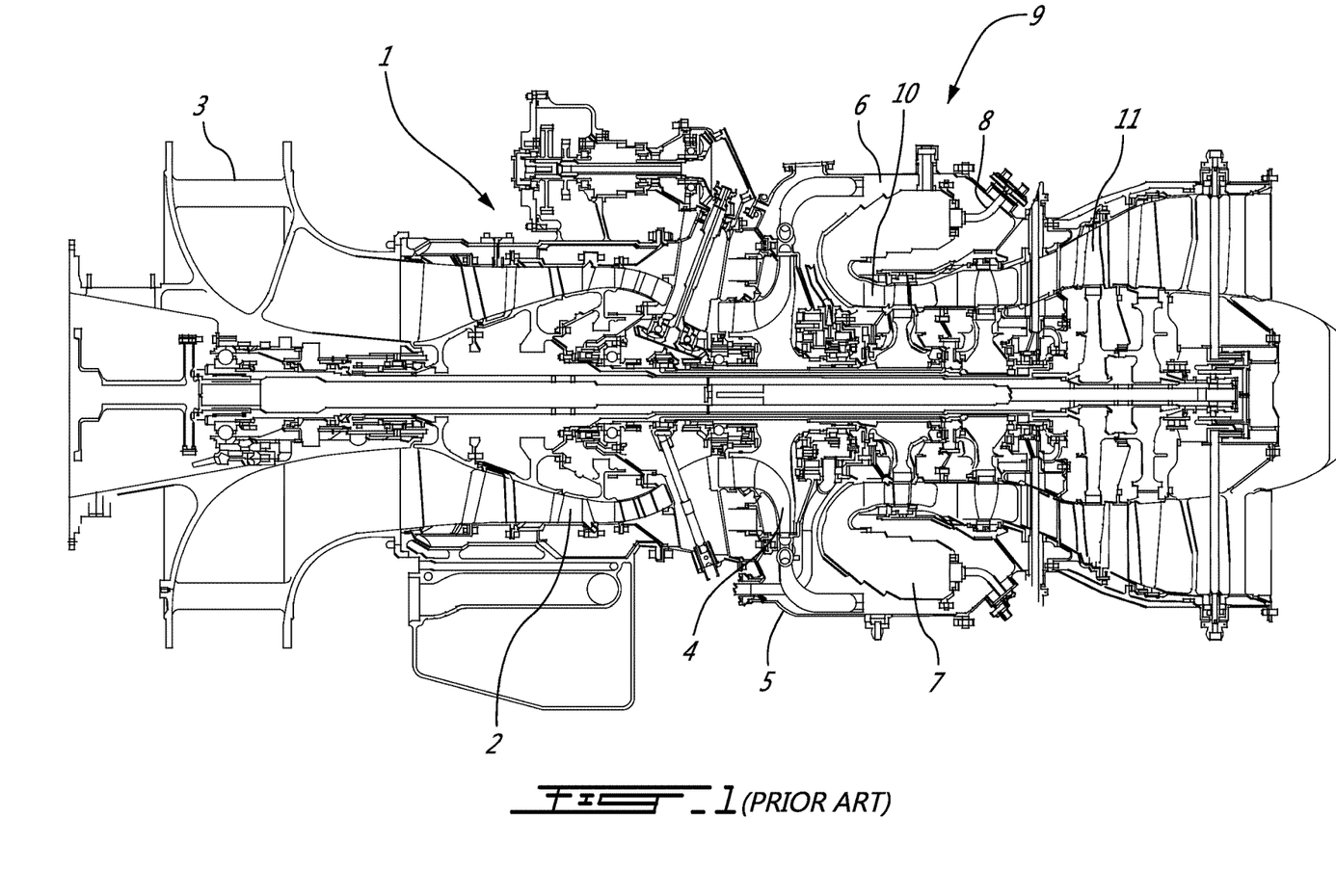
FIG. 1 is an axial cross-sectional view through an example prior art turbo-shaft gas turbine engine having a combustor including interior heat shield liner panels and an igniter extending through the combustor and heat shield.

FIG. 1 shows an axial cross-section through an example turbo-shaft gas turbine engine 1. It will be understood that the invention is equally applicable to any type of gas turbine engine 1 with a combustor 7 and turbines 11 such as a turbo-fan, a turbo-prop, or auxiliary power units.

In the example, air enters the engine 1 through the intake 3 then into the low-pressure axial compressor 2 and high-pressure centrifugal compressor 4. Compressed air exits the high-pressure compressor 4 through a diffuser 5 and is contained within a plenum 6 that surrounds the combustor 7. The combustor 7 in the example is a reverse flow annular combustor 7 with perforated inner and outer shells permitting compressed air from the plenum 7 to enter the combustor 7 to mix with fuel and provide a flow of cooling air to protect the combustor shells. Fuel is supplied to the fuel nozzles through fuel tubes 8 and fuel is mixed with compressed air from the plenum 7 when sprayed through nozzles into the combustor 8 as a fuel air mixture that is ignited by the igniter 9.

The combustor 7 interior is lined with perforated heat shield panels of ceramic for example that protect the combustor shells from direct exposure to hot combustion gases. Compressed air passes through perforations in the combustor shells 12 (see FIGS. 2-4) into an intermediate cooling cavity 16 between the shells 12 and the combustor heat shield panels 13. The air passes through the intermediate cooling cavity 16 and is admitted into the combustor 7 through perforations in the heat shield panels 13 thereby creating a cooling air curtain along the inner surfaces of the heat shield panels 13 that eventually mixes with the turbulent hot gases in the combustor 7. Hot gases from the combustor 7 pass over the nozzle guide vane 10 and drive the turbines 11 before exiting the tail of the engine as exhaust.

Figure 2:
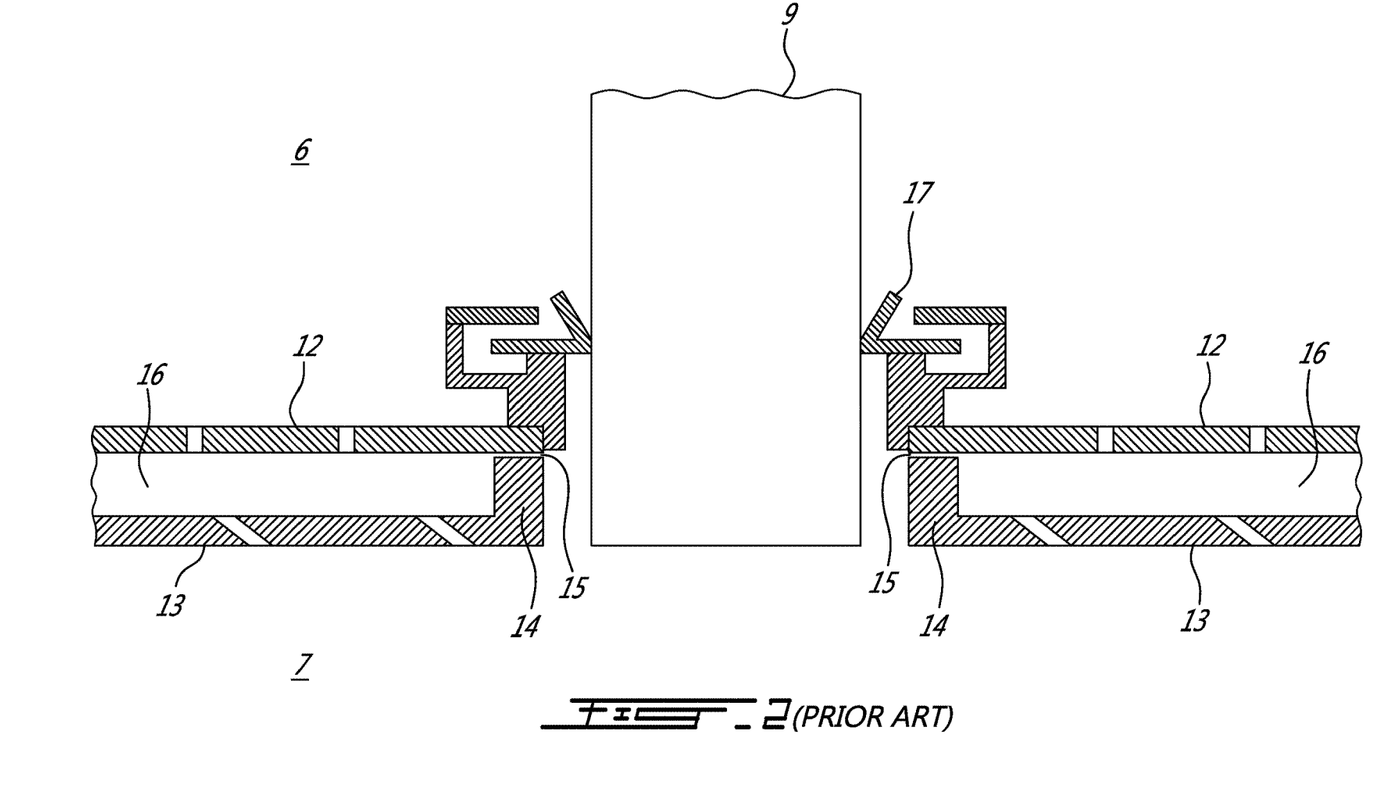
FIG. 2 is a detail axial cross-section view through the igniter, the adjacent combustor shell and heat shield panel of FIG. 1, showing the arrangement of a prior art opening in the heat shield panel with a single circumferential rail sealed against the interior surface of the combustor shell.

FIG. 2 is shows a detailed axial cross-section view through the igniter 9 where it passes through the adjacent combustor shell 12 and heat shield 13. In this prior art example the igniter 9 extends through an opening in the shell 12 and heat shield 13. A single circumferential rail 14 is sealed against the combustor shell 12 with a gap 15 between as a consequence of manufacturing tolerances and differential thermal expansion and contraction. Air leakage occurs through the gap 15 since compressed cooling air is contained within the intermediate cavity 16 under a higher pressure than the combustion gases within the combustor 7. Compressed air is intended to pass from the plenum 6 through the perforated shell 12 into the intermediate cavity 16, then into the combustor 7 through the perforated heat shield 13.

However leakage through the gap 15 is uncontrolled and undesirable which can decrease engine efficiency through increased use of compressed cooling air and unintended dilution of combustion gases. Leakage is especially undesirable in smaller engines since manufacturing tolerances are similar to those of larger engines, however the proportion of leakage relative to controlled air flow is greater in smaller engines. The same size of gap 15 will lead to a generally greater proportion of leaked air relative to controlled air in a smaller engine compared to a larger engine. Leakage is controlled from the plenum 6 with a sliding seal 17 that engages the side walls of the igniter 9. The rail 14 is used to seal around the igniter opening since the heat shield 13 is a ceramic material exposed to hot gases and tolerances are required for manufacturing and thermal expansion/contraction.

FIG. 3 shows a detail axial cross-section view similar to FIG. 2 but showing an upstream rail 18 and an downstream rail 19 defining an intermediate groove 20 between rails 18, 19 in accordance with a first embodiment. The creation of multiple sealing surfaces makes the seal more restrictive than a single seal surface. Multiple rails 18, 19 and intermediate groove 20 force leaking air through multiple entry and exit paths over edge surfaces that result in increased flow energy losses. Increased pressure loss as well as increased heat transfer results from turbulence caused by the use of multiple rails with multiple sealing surfaces.

Figure 5:
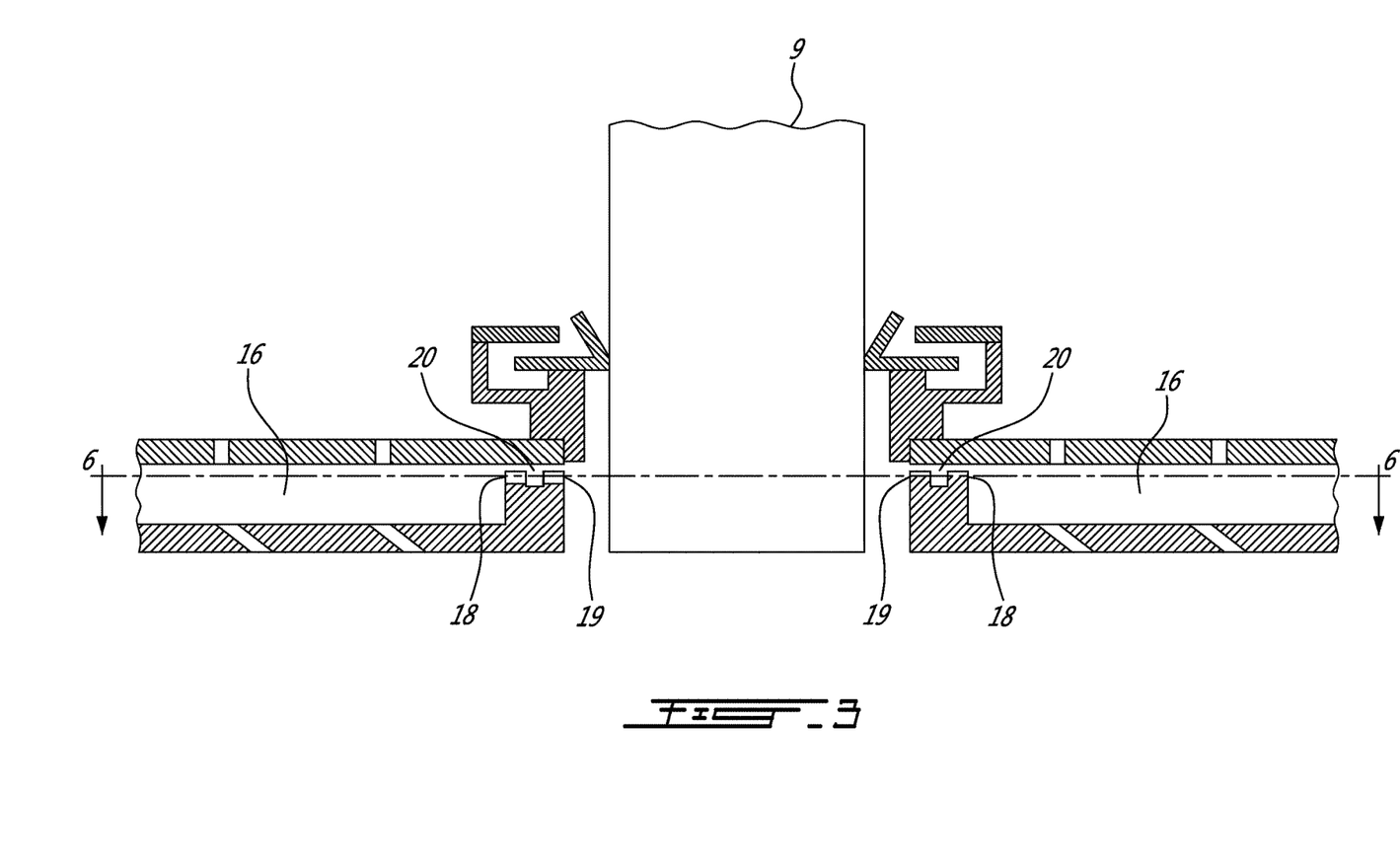
FIG. 5 is an inward facing isometric view of the first embodiment showing two rails surrounding the igniter opening in the heat shield panel where radially oriented slots are provided equally spaced about the circumference of the rails to permit air flow from the intermediate cooling cavity into the intermediate groove and then into the combustor.

FIG. 5 shows an inward facing isometric view of the first embodiment of FIG. 3. The upstream and downstream rails surround the igniter opening in the heat shield 13. Radially oriented slots 21 are equally spaced about the circumference of the rails 18, 19 to permit air flow from the intermediate cooling cavity 16 into the intermediate groove 20 and then into the combustor 7. Arrows in FIG. 6 indicate the air flow direction through the slots 21 in the rails 18, 19 and through the intermediate groove 20 thereby cooling the rails 18, 19 and impeding leakage.

Figure 6:
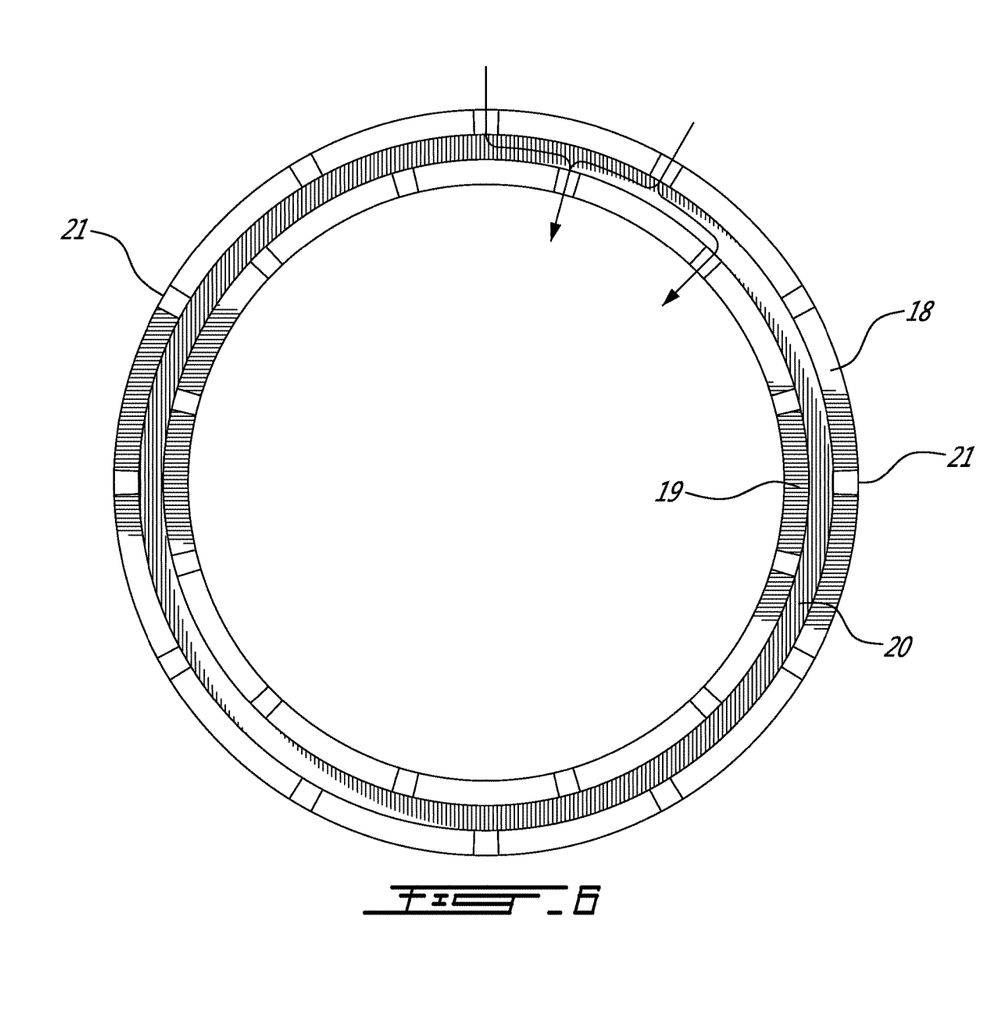
FIG. 6 is an inward facing sectional view of the first embodiment along line 6-6 of FIG. 3 with arrows indicating the cooling air flow direction through the slots in the rails and through the intermediate groove thereby cooling the rails and impeding leakage.

Referring to FIGS. 3, 5 and 6, a seal for sealing a combustor heat shield 13 against an interior surface of a combustor shell 12 includes an upstream rail 18 and an downstream rail 19 defining an intermediate groove 20 therebetween. Each rail 18, 19 has a sealing surface with a plurality of slots 21 extending between an upstream side surface and a downstream side surface. The sealing surface conforms closely to the interior surface of the combustor shell 12 and, due to manufacturing tolerances and thermal expansion, a leakage gap remains between the rails 18, 19 and the shell 12. The illustrated embodiments show an example where the rails 18, 19 are disposed about the periphery of an opening within the heat shield 13 for the igniter 9. The same manner of seal with rails 18, 19 and groove 20 can also be disposed on an outer edge of the heat shield 13 where joints between heat shield panels 13 are located.

Figure 4:
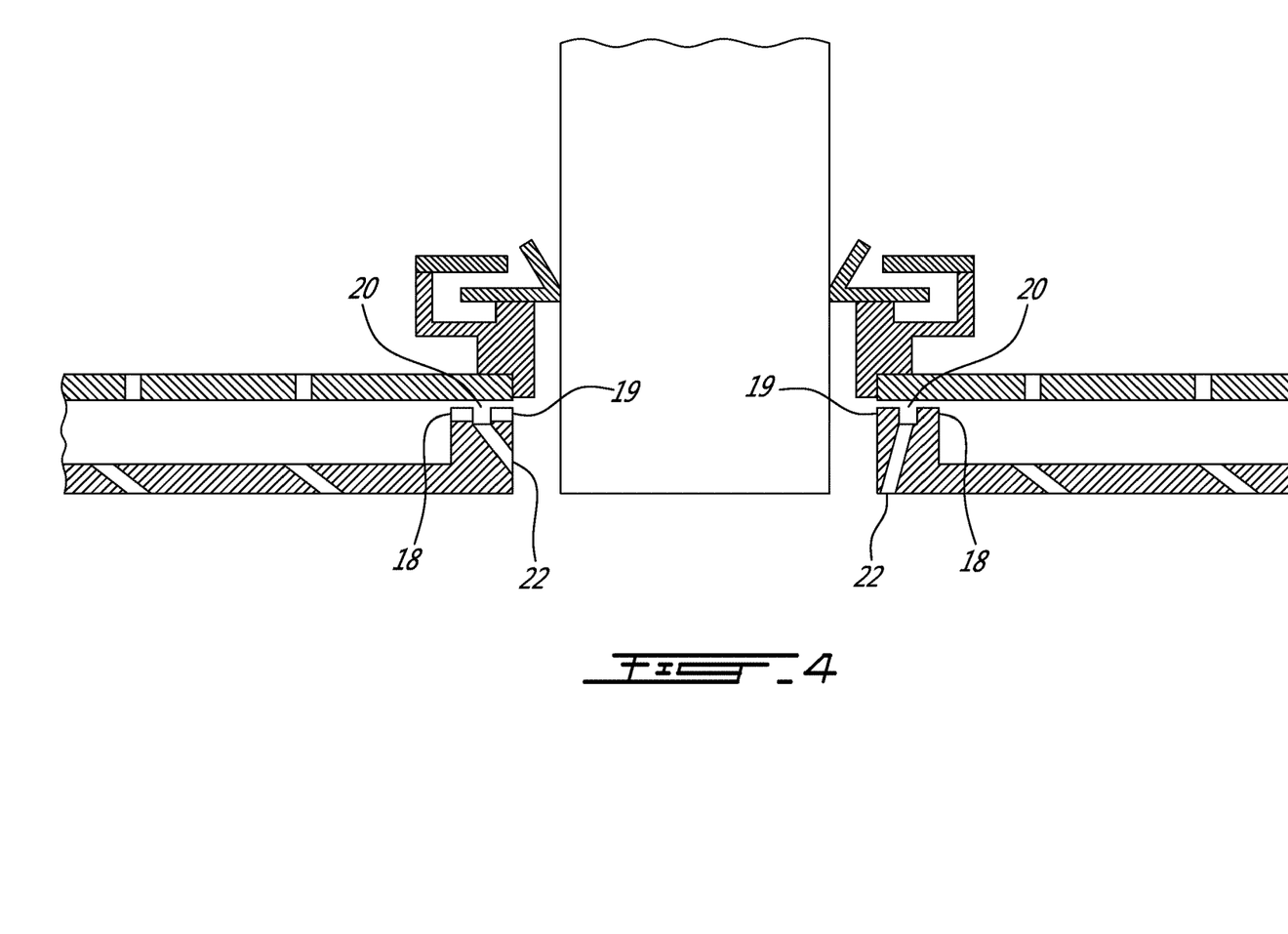
FIG. 4 is a detail axial cross-section view showing a second embodiment with air flow bores extending between the intermediate groove and the interior surface of the heat shield panel adjacent the igniter opening.

FIG. 4 shows a second embodiment including an air flow bore 22 extending between the intermediate groove 20 and an interior surface of the heat shield 13. One of the bores 22 provide air flow to purge the area between the igniter 9 and the heat shield 13 thereby reducing exposure of the igniter 9 to hot combustion gases and avoiding the development of trapped gases that could create hot spots on the igniter 9. Other bores 22 may exit on the gas path surface, to better cool the heat shield around the igniter opening.

In the first embodiment shown in FIGS. 5-6, the slots 21 are equidistantly spaced apart to provide uniform air flow and air cooling of the rails 18, 19. To increase resistance to air flow and improve cooling the slots 21 in the upstream rail 18 are disposed in staggered relation between slots 21 in the downstream rail 19. The resultant air flow is shown in arrows in FIG. 6.

Figure 10:
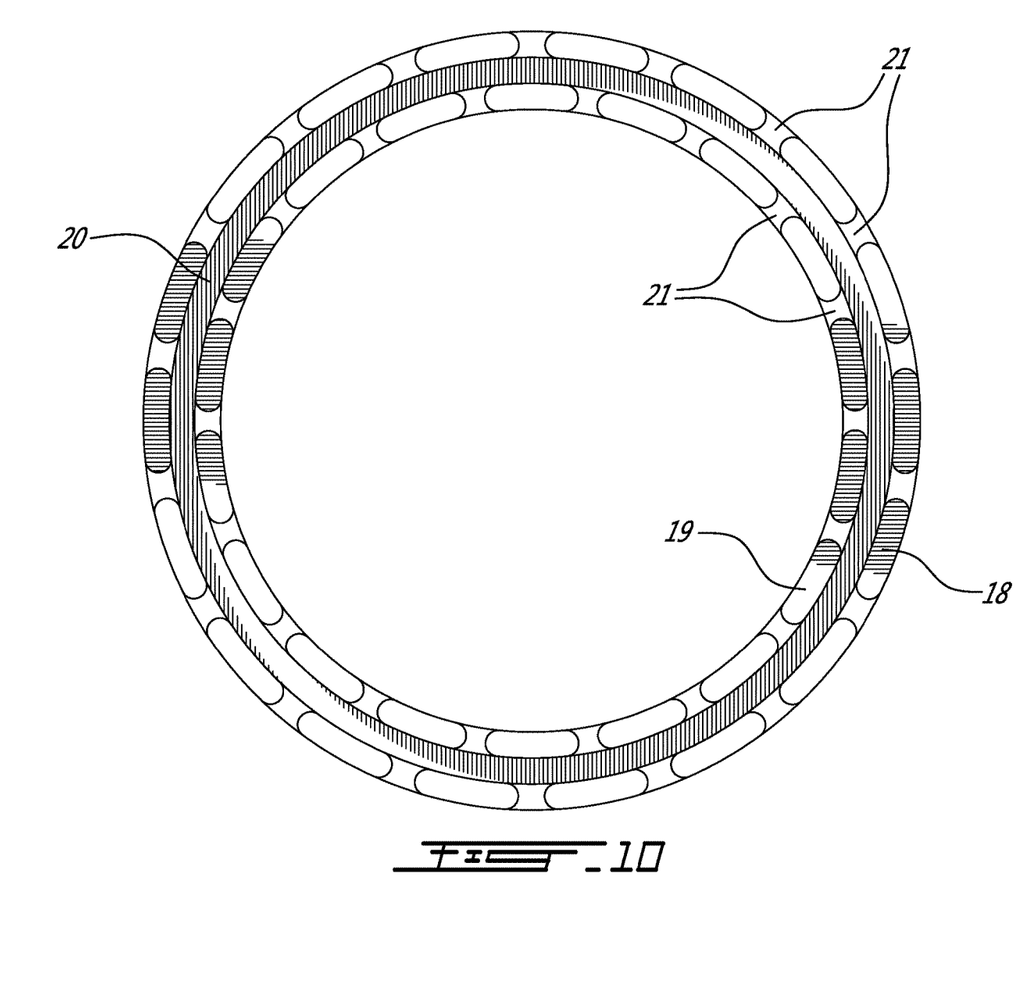
FIG. 10 shows a fifth embodiment similar to FIG. 6 where the edges of the slots have been rounded to reduce air flow pressure losses and disperse the air flow for improved cooling of the rails.

FIG. 10 shows a fifth embodiment alternative where the slots 21 have rounded edges. In this alternative the edges of the slots 21 have been rounded to modify air flow pressure losses and disperse the air flow for improved cooling of the rails 18, 19.

Figure 7:
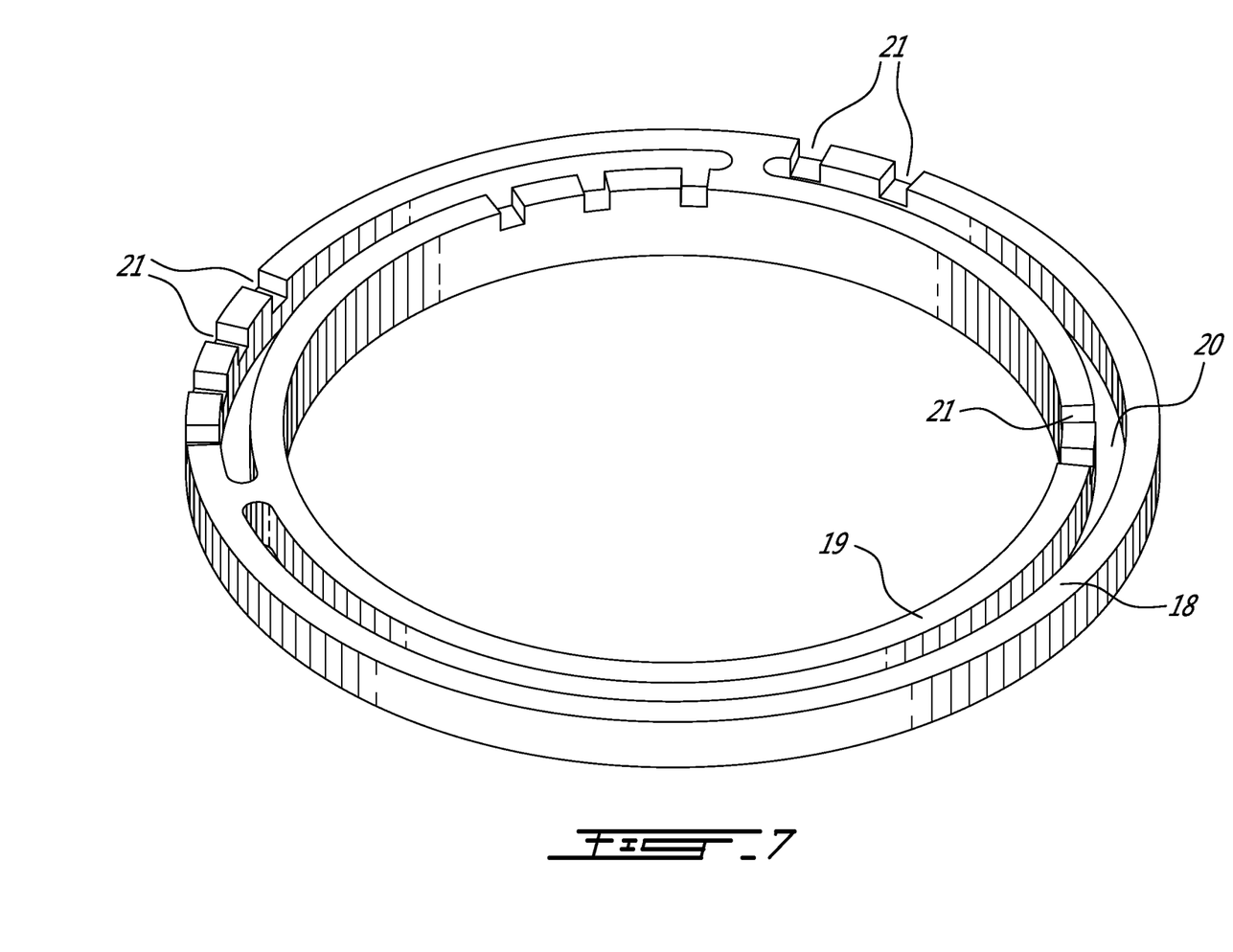
FIGS. 7 and 8 show views of a third embodiment similar to FIGS. 5-6 where the third embodiment has slots in the rails provided only in selected areas to direct air flow as indicated by the arrows.
Figure 8:
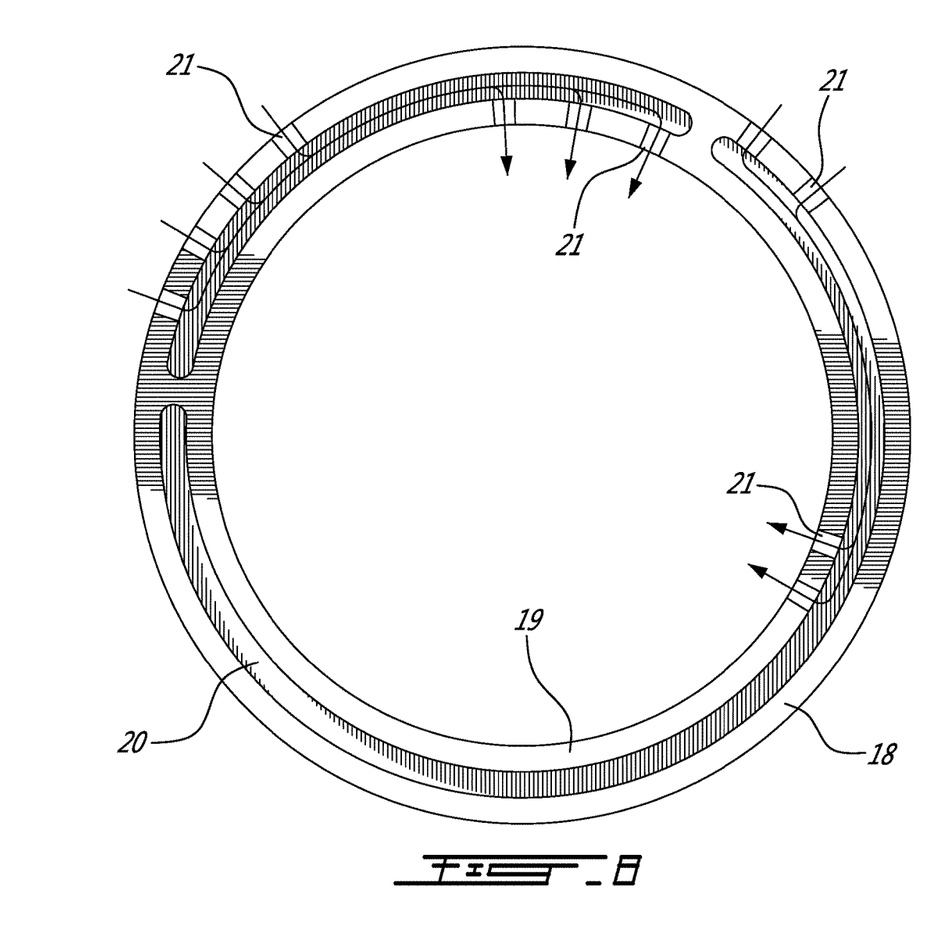
Figure 9:
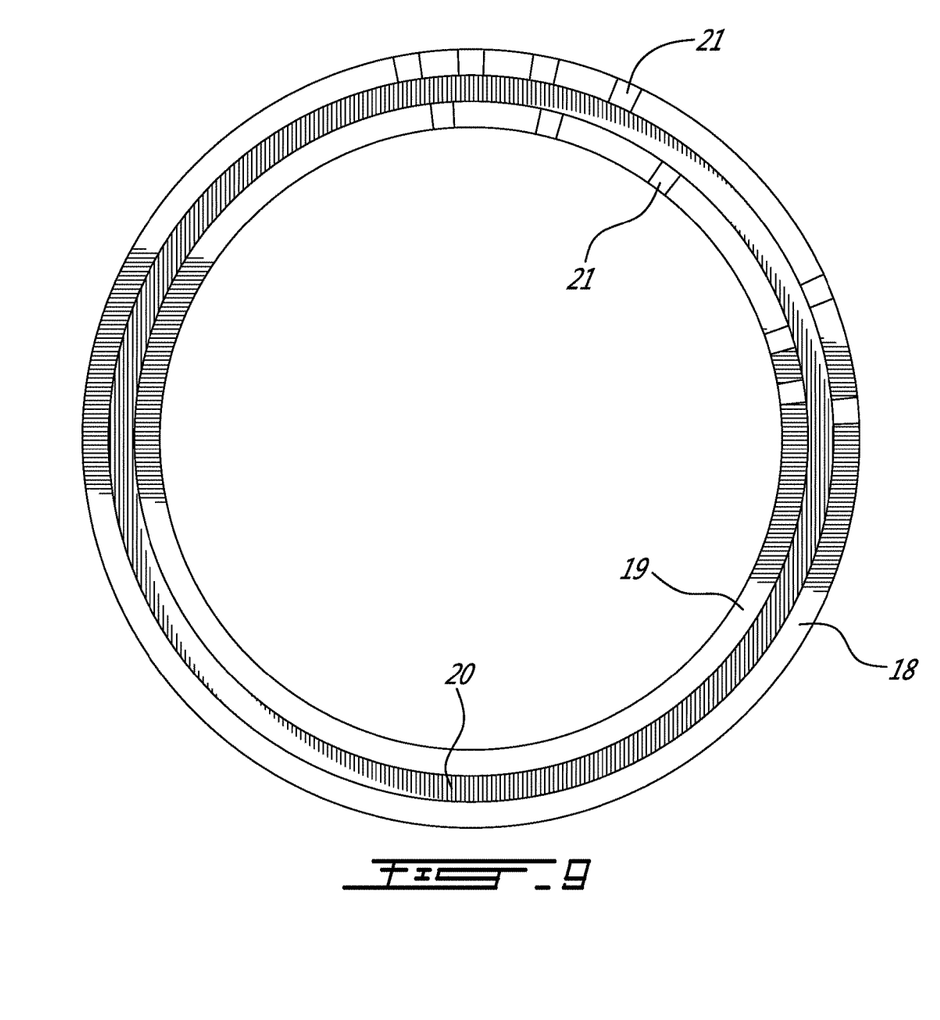
FIG. 9 shows a fourth embodiment with slots in the rails provided in alternative selected areas to direct air flow.

FIGS. 7 and 8 show a third embodiment where slots 21 in the upstream rail 18 are disposed a selected distance from slots 21 in the downstream rail 19 . The cooling air flow as shown by arrows in FIG. 8 is directed along the intermediate groove 20 parallel to and between the rails 18, 19. FIG. 9 shows an alternative fourth embodiment where slots 21 are disposed to direct cooling air in local areas to a greater extent. The slots 21 can be located in areas where localized heat is encountered while minimizing air leakage.

The above description is meant to be exemplary only, and one skilled in the art will recognize that changes may be made to the embodiments described without departing from the scope of the invention disclosed. For example, the invention can be provided in any suitable heat shield configuration and in any suitable combustor configuration, and is not limited to application in turbofan engines. It is understood that the principles of the inventions are not limited to combustor dome heat shields. Still other modifications which fall within the scope of the present invention will be apparent to those skilled in the art, in light of a review of this disclosure, and such modifications are intended to fall within the appended claims..

We claim:

1. A seal configured to provide sealing between a combustor heat shield and an interior surface of a combustor shell, the seal comprising:
    a projection extending integrally from a back face of the combustor heat shield, the projection having a distal end surface configured to face the interior surface of the combustor shell;
    an upstream rail and a downstream rail relative to a flow of cooling air between the combustor heat shield and the combustor shell, the upstream rail and the downstream rail being integrally formed on said distal end surface of the projection, the upstream rail and the downstream rail restricting air cooling leakage in series and defining an intermediate groove therebetween in said distal end surface of the projection, each of the upstream rail and the downstream rail having a sealing surface with a plurality of slots extending between an upstream wall surface and a downstream wall surface, the slots in the downstream rail being connected in flow communication with the slots in the upstream rail via the intermediate groove, the sealing surface of each of the upstream rail and the downstream rail configured for conforming to the interior surface of the combustor shell and for defining a leakage gap between the sealing surface of each of the upstream rail and the downstream rail and the interior surface of the combustor shell.

2. The seal according to claim 1, wherein the upstream rail and the downstream rail are circular and configured to be concentrically disposed about a periphery of an igniter opening defined in the heat shield, the upstream rail surrounding the downstream rail.

3. The seal according to claim 1, wherein the upstream rail and the downstream rail are configured to be disposed on an outer edge of the heat shield.

4. The seal according to claim 1 comprising an air flow bore defined in a wall of the intermediate groove, the wall located between the upstream wall surface of the downstream rail and the downstream wall surface of the upstream rail.

5. The seal according to claim 1, wherein the plurality of slots are equidistantly spaced apart.

6. The seal according to claim 5, wherein the slots in the upstream rail are disposed in staggered relation between slots in the downstream rail.

7. The seal according to claim 1, wherein the slots have rounded edges.

8. The seal according to claim 1, wherein slots in the upstream rail are disposed a selected distance from slots in the downstream rail whereby cooling air flow is directed the selected distance along the intermediate groove between the rails.

9. A combustor heat shield for a gas turbine engine, comprising a heat shield panel adapted to be mounted to a combustor shell with a back face of the heat shield panel in spaced-apart facing relationship with an interior surface of the combustor shell to define an air gap between the back face of the heat shield panel and the interior surface of the combustor shell, a projection extending form the back face of the heat shield, the projection configured to extend across the air gap, an upstream rail and a downstream rail relative to a flow of cooling air through the air gap, the upstream and downstream rails being integrally formed on a distal end surface of the projection for sealing engagement with the combustor shell, the upstream rail and the downstream rail defining an intermediate groove therebetween, the intermediate groove being defined in the distal end surface of the projection and having a depth which is smaller than that of the air gap, each of the upstream rail and the downstream rail having a sealing surface with a plurality of slots extending between an upstream wall surface and a downstream wall surface, the sealing surface of each of the upstream rail and the downstream rail conforming to the interior surface of the combustor shell and defining a leakage gap between the sealing surface of each of the upstream rail and the downstream rail and the interior surface of the combustor shell.

10. The heat shield according to claim 9, wherein the upstream rail and the downstream rail are disposed about a periphery of an opening within the heat shield panel.

11. The heat shield according to claim 9, wherein the upstream rail and the downstream rail are disposed on an outer edge of the heat shield panel.

12. The heat shield according to claim 9, comprising an air flow bore extending between the intermediate groove and a front face of the heat shield panel.

13. The heat shield according to claim 9, wherein the plurality of slots are equidistantly spaced apart.

14. The heat shield according to claim 9, wherein the slots in the upstream rail are disposed in staggered relation between slots in the downstream rail.

15. The heat shield according to claim 9, wherein the slots have rounded edges.

16. The heat shield according to claim 9, wherein slots in the upstream rail are disposed a selected distance from slots in the downstream rail whereby cooling air flow is directed the selected distance along the intermediate groove between the rails.

* * * * *